M. COPPS.
CURE OR REPAIR FOR AUTOMOBILE TIRE RIM CUTS AND BLOW-OUTS.
APPLICATION FILED JULY 15, 1916.

1,276,179.
Patented Aug. 20, 1918.

Inventor:
Mike Copps,
by

UNITED STATES PATENT OFFICE.

MIKE COPPS, OF REIDSVILLE, GEORGIA.

CURE OR REPAIR FOR AUTOMOBILE-TIRE RIM-CUTS AND BLOW-OUTS.

1,276,179.      Specification of Letters Patent.     Patented Aug. 20, 1918.

Application filed July 15, 1916. Serial No. 109,478.

*To all whom it may concern:*

Be it known that I, MIKE COPPS, a citizen of the United States, residing at Reidsville, in the county of Tattnall and State of Georgia, have invented certain new and useful Improvements in Cure or Repair for Automobile-Tire Rim-Cuts and Blow-Outs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means for repairing or curing "blow-outs" and "rim-cuts" particularly in automobile tires; and it contemplates and comprises the drawing and holding together of the opposite edges of the fracture by means of staples or pronged hooks which are applied so that the connecting neck or web of the hooks will straddle the fracture and the prongs will pass through and be bent down upon the other side of the shoe or tire so as to draw and hold together the opposite edges of the fracture or opening and thus prevent the same from being pressed open or separated when the inner tire is inflated and thus prevent the inner tire being forced into and "pinched" and damaged, which would occur if it entered the fracture.

The staples or hooks are preferably, but not necessarily, of oval formation in cross-section so as not to have sharp or angular edges, and the portions of the prongs which are bent down upon the shoe or casing are preferably formed with spurs so as to more securely grip and hold to the shoe.

To the accomplishment of the foregoing and such other objects as may hereinafter appear the invention consists in the features hereinafter particularly described and then sought to be clearly defined by the claims, reference being had to the accompanying drawing forming a part hereof, and in which—

Figure 1:
Figure 1 is a side view of a portion of the shoe or casing showing the invention applied to a "rim-cut"
Figure 2:
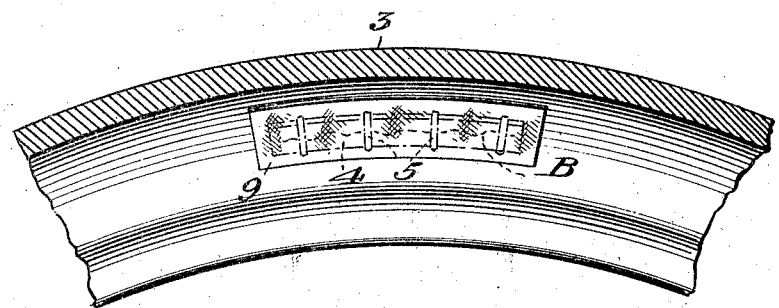
Fig. 2 is a vertical longitudinal section through a portion of a shoe showing the invention applied to a "blow-out"
Figure 3:
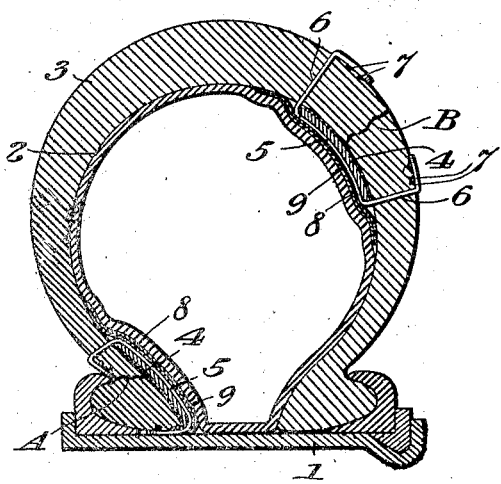
Fig. 3 is a cross section through a shoe, inner tube, and wheel rim, with the invention applied to both a "rim-cut" and a "blow-out"
Figure 4:
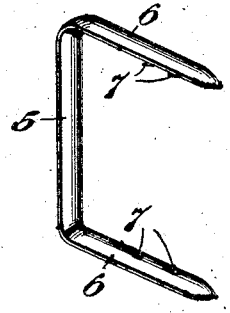
Fig. 4 is a perspective of a clamping staple or pronged hook, of the preferred form.

In the drawing the numeral 1 designates a rim of a wheel, 2 the inner tube of a pneumatic tire, and 3 the outer casing or shoe of the tire, all of which may be of any of the types in common every-day use. The outer shoe is illustrated with a "rim-cut" at A and a "blow-out" at B, both of which are shown as "cured" or repaired under the present invention which is the same in both instances and therefore the reference characters for one may be the same for both. Across the fracture or opening, on the inside of the shoe, is laid a strip 4 of any suitably strong fabric which will extend lengthwise of the fracture. Extending cross-wise of the fabric, and straddling the fracture, are placed any desired number of staples or hooks 5, the webs or connecting necks of the hooks lying against the fabric-strip and the prongs 6 thereof projected through the body of the shoe and their extremities bent downwardy upon the shoe surface, preferably pointing toward each other as shown. The fabric-strip covers the fracture on the inside of the shoe and the bending and clenching of the extremities of the hooks draw and hold the edges or walls of the fracture together, the fabric-strip also being tightly clamped in place over the fracture, so that when the inner tire is inflated it cannot possibly enter and be "pinched" between the walls of the fracture. In this simple way the "rim-cut" or "blow-out" or both, may be quickly and effectively "cured" or repaired.

The staples or hooks are preferably formed oval-shaped in cross-section as illustrated so as to avoid the existence of sharp corners, or angles, although this is not absolutely essential for a practical embodiment of the invention. The extremities of the hook prongs which will be bent down upon the shoe are preferably formed with spurs 7 which will pierce the outer surface of the shoe and insure a secure grip thereon.

While the foregoing has been found to be very effective and sufficient for the purpose, a thin layer 8 of cotton fiber, or raw-cotton, or equivalent substance may be laid over the necks or webs of the staples on the side next to the inner tube so as to form an elastic cushion over the staples between them and the inner tube, and this cushion may be held in place by a covering of relatively thin and strong fabric 9 which may be attached to the shoe by any suitable cement, thus holding the covering and cushion in place. The edges of the cushion may be tapered off so that no pronounced shoulder will exist between the inner tube and the shoe where the repair or "cure" is effected. This cushion will prevent contact between the inner tube and metal clamping hooks or staples, and thus additional safeguard against damage to the inner tube provided. This elastic cushion is not absolutely essential but its use is preferred.

I have described with particularity the preferred form of the invention but changes can be made in the details and essential features retained.

Having described my invention and set forth its merits, what I claim is:—

1. The "rim-cut" and "blow-out" repair for pneumatic tires, comprising a covering-strip disposed to cover the fracture in the outer-shoe or casing, and staples disposed to straddle the fracture in the shoe and lie across said strip and have their prongs projected through the shoe and bent down upon the surface of the shoe to hold the covering-strip in place and the fracture closed, the junction between the prongs and connecting web of the staples forming angles confining the covering-strips at opposite sides of the fracture, substantially as described.

2. The "rim-cut" and "blow-out" repair for pneumatic tires, comprising a covering-strip disposed to cover the fracture in the outer-shoe or casing, staples disposed to straddle the fracture in the shoe and lie across said strip and have their prongs projected through the shoe and bent down thereon, the junction between the prongs and connecting web of the staples forming angles confining the covering-strip at opposite sides of the fracture, and a protecting cushion covering the staples on the inside of the shoe between them and the inner tube, substantially as described.

In testimony whereof I affix my signature in presence of two witnesses.

MIKE COPPS.

Witnesses:
  H. H. ELDERS,
  J. S. ROGERS.